July 21, 1959 G. S. HARTLEY 2,895,808
APPARATUS FOR THE SEPARATION OF SOLUTES BY PARTITION
Filed Oct. 13, 1955 2 Sheets-Sheet 1

INVENTOR.
Gilbert S. Hartley,
BY
Wenderoth, Lind & Ponack
ATTYS.

United States Patent Office 2,895,808
Patented July 21, 1959

2,895,808

APPARATUS FOR THE SEPARATION OF SOLUTES BY PARTITION

Gilbert S. Hartley, Fulbourn, England, assignor to Fisons Pest Control Limited, Bourn, England, a British company Application October 13, 1955, Serial No. 540,242

Claims priority, application Great Britain October 19, 1954

9 Claims. (Cl. 23—267)

This invention relates to an improved apparatus for the separation of solutes by partition.

The technique of partition chromatography is widely used in analytical chemistry to separate dissolved substances of similar chemical constitution. It consists essentially of allowing one solvent to flow successively past a large number of separate portions of an immiscible second solvent sufficiently slowly for diffusive equilibrium to be reached at each place where the solvents are in contact. To hold the numerous small separate portions of "standing" solvent in position, they are usually arranged to be present between the interstices of a column of inert finely divided solid. The moving solvent flows slowly through this column. If a mixture of dissolved substances is introduced at the top of the column, and if they have equilibrium partition coefficients between the two solvents which slightly differ, the solutes are separated as they pass down the column and appear in the outflowing solvent, if concentration is plotted against time, in separate zones.

This device is generally satisfactory for separation of the very small quantities which are normally sufficient for analytical purposes, but if the device is to be called upon to separate larger amounts which may be required for other purposes the column has to be inconveniently large. If it is made of great diameter it is extremely difficult to arrange uniform flow down it.

In order to obtain separation of larger quantities, another application of the same principle is to cause the moving solvent to flow successively through series of separate vessels which are mainly filled with the standing solvent. If the standing solvent is heavier than the moving solvent the latter is led into the bottom of each vessel and out at the top. Successful separation necessitates rapid exchange of solutes, according to the partition ratios, between the two solvents in every vessel. In the column as used for analysis this is arranged by having the discrete solvent portions so small that pure diffusion ensures rapid exchange. When larger portions of the solvents are used in every stage they must be thoroughly agitated together in each vessel. Several devices have been suggested to provide the required conditions in a convenient manner. It is an object of the present invention to provide a device more convenient in the construction and use than ones already described.

The present invention provides an improved method of separating solutes dissolved in a common solvent by intimate contact with a second solvent substantially immiscible with the first and of different specific gravity which comprises passing one of the liquids continuously through a series of mixing vessels each of which contains mainly the other liquid and is preferably completely filled with liquid and agitating the two liquids by means of at least one loose body which is caused to move in each vessel, the liquid passing from one mixing vessel to another through a tube in which liquid-liquid separation takes place.

The mixing vessels are preferably cylindrical and the loose bodies therein may comprise rods, balls or the like which are moved suitably at right angles to the axis of the vessel.

The present invention also provides an apparatus which comprises a number of mixing vessels connected together in series, at least one loose body in each vessel, each of said vessels being provided with an outlet tube and an inlet tube, the outlet tube being adapted to permit the separation therein of the liquid phases, the outlet tube from one vessel being connected to the inlet tube of another vessel, and means for causing the said loose bodies to move in said mixing vessels.

The mixing vessels are preferably cylindrical and the loose bodies therein may comprise rods, balls or the like which are moved suitably at right angles to the axis of the vessel. The vessels may be constructed of glass and can be connected together by glass tubes. The apparatus is preferably rigidly supported externally by the insertion of the apparatus while hot into suitably shaped rubber or plastic sheaths. According to a preferred embodiment of the invention the apparatus is mounted or embedded in a block of polythene.

The agitation required in each vessel may be effected for example by employing as the loose bodies in the mixing vessels magnetisable bars, rods or balls, each of which is suitably sealed into a glass or like sheath, and is caused to move by a fluctuating magnetic field obtained either by the mechanical motion of a series of permanent magnets situated close to the vessels, or by means of fixed electromagnets which can be magnetised periodically.

A more convenient method for effecting the agitation is to oscillate the whole assembly thus causing movement of the loose bodies which may comprise bars, rods, balls and the like, in the mixing vessels. In the preferred embodiment of the invention the mixing vessels are cylindrical and the loose bodies are rods for example of glass, and the assembly is oscillated at right angles or approximately at right angles to the axes of the cylinders. The oscillation of the apparatus may be obtained in any way, for example the apparatus may be mounted on an oscillating or vibrating table or the like, or may be mounted on a pendulum device. The pendulum device may comprise two pendulum members which are supported one inside the other from a flexible fulcrum member, a driving mechanism being carried on one member adapted to oscillate the pendulum members with respect to each other, the apparatus being carried on one of the pendulum members, suitably not the one carrying the driving mechanism. An embodiment of this type of device is described more fully hereafter.

Near one end of each vessel is an outlet tube which extends from the top surface upwards before turning over to form an inlet tube which enters one end of the next vessel. The mixing vessels may be arranged in any pattern which is desired. A suitable arrangement is to have the vessels arranged with their longitudinal axes parallel, the liquid flowing through all vessels in the same sense. The connecting outlet-inlet tubes may be arranged in any desired way and may connect adjacent vessels end to end, or be twisted to connect vessels arranged side by side.

According to a preferred embodiment of the invention the inlet or return parts of such tubes are of relatively narrow bore, for example not more than 3 millimetres' diameter, so that when most ordinary liquids are passed through them for the first time, displacing air, there is no tendency for discrete air bubbles to be trapped. The outlet tubes are preferably of increased diameter so that there is therein a slower linear flow thus assisting the separation of the liquids.

In those cases where it is desired that a lighter liquid flows from one vessel to the next the outlet tube ascends from the mixing vessel; in those cases where it is desired that a denser liquid flows from one vessel to the next the apparatus is inverted so that the outlet tube descends from the mixing vessel.

A preferred embodiment of the invention is shown solely by way of illustration in the accompanying drawings.

The apparatus comprises a series of cylindrical glass vessels 1, 1'. Each vessel contains one or more glass rods 2, 2'. Near one end of each vessel is a glass exit tube 3, 3', which extends from the top surface upwards before turning over to form an inlet tube 4, 4', which enters one end of the next vessel. The assembly is embedded in a polythene block, suitably the glass cylinder while hot being inserted into a polythene block in a solid or plastic state, the glass connections being then made as appropriate. As the assembly cools, the polythene contracting more strongly than glass, grips the glass cylinders automatically holding it in the position determined by the sealing of the connecting tubes one to another. Any other mechanical device for holding the assembly is of course acceptable, but that proposed is simple of manufacture and has also the advantage that the whole assembly, having been made of material resistant to corrosive acids, is conveniently cleaned by ordinary laboratory technique.

Figure 1:
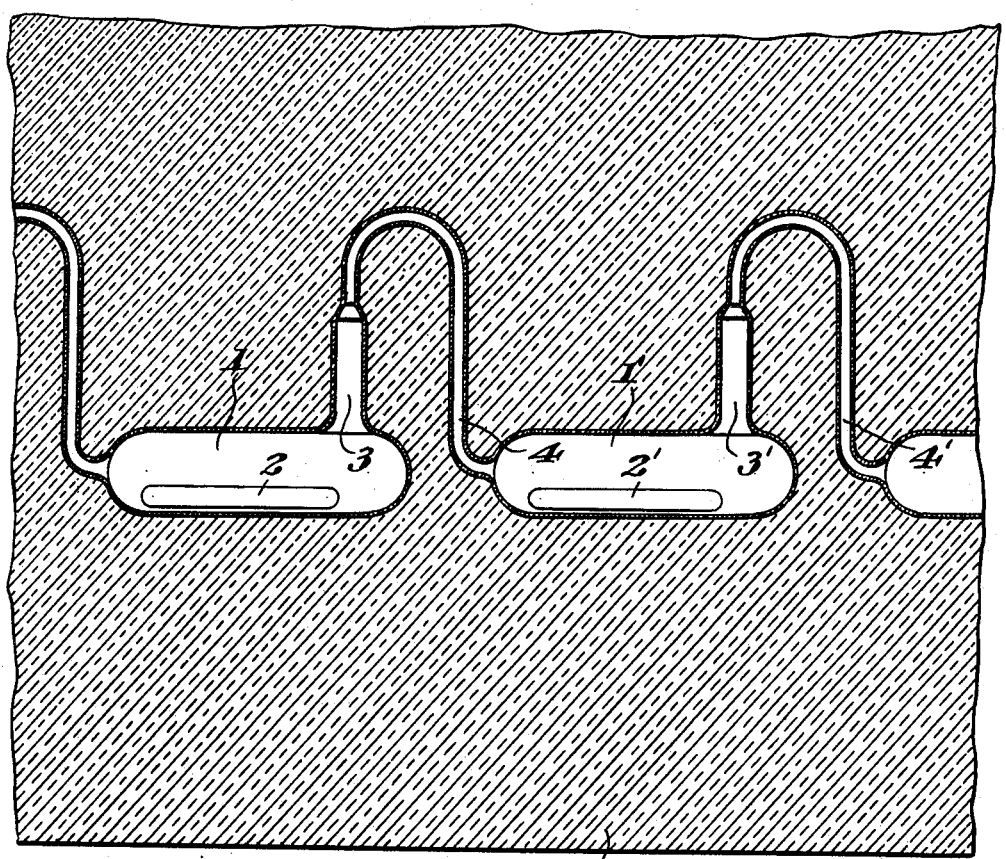
Figure 1 is a cross-sectional view of mixing vessels of an apparatus according to the present invention.
Figure 2:
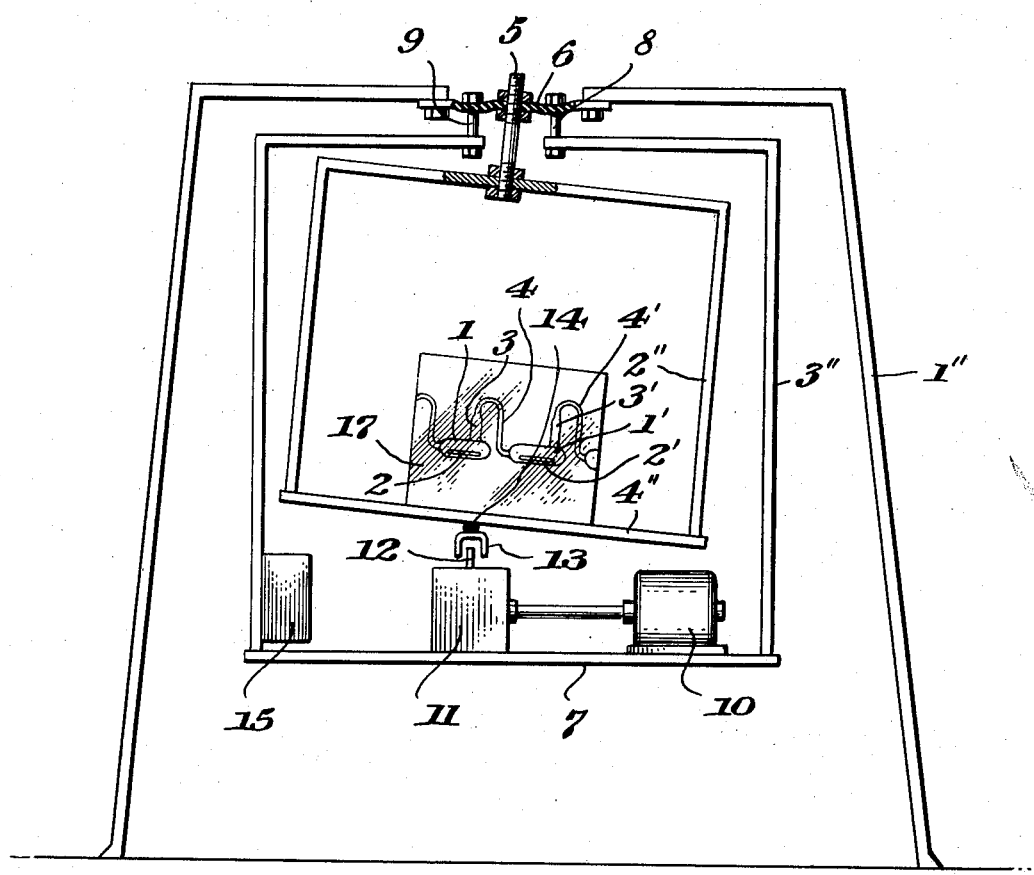
Figure 2 is a diagrammatic cross-sectional view of a pendulum-type support.

In Figure 2 is shown an apparatus for agitating the apparatus above which causes little wear of mechanical bearings and external vibratory interference. The apparatus comprises a stationary main frame 1" from which two pendulum members 2" and 3" are supported, one inside the other. The inner pendulum member 2" comprises a substantially horizontal platform 4", which is connected to the rod 5 by appropriate bars. The rod 5 is secured in any suitable way to the centre of a flexible fulcrum member 6 in the form of a circular rubber sheet, which is secured at its outer edge to the main frame 1". The outer pendulum member 3" also comprises a substantially horizontal platform 7, and is connected to the rods 8 and 9 by appropriate bars. The rods 8 and 9 are secured in any suitable way to the fulcrum member 6 symmetrically spaced from the rod 5. The suspension means of the two pendulums are arranged so as not to touch one another.

The platform 7 carries at one side an electric motor 10 which transmits through appropriate means 11 vibratory or oscillating motion to the pendulum 3", suitably for example through a vertical spindle 12 which engages in a bearing 13 carried by a flexible support 14 on the underside of the platform 4". The pendulum 3" also carries a counterweight 15 to balance the weight of the motor, and to ensure that of the two pendulums, the pendulum 3" makes the shorter movement.

The assembly of vessels is mounted on the platform 4", so that it is agitated in directions at right angles to the longitudinal axes of the vessels.

In operation, the motor 10 is operated and the rotational movement of the means 11 is transmitted to the pendulum 2" in the form of vibratory or oscillatory movement. This causes the pendulum 2" to oscillate about the flexible fulcrum member 6. Any vibrations of the pendulum 3" due to the reaction between the means 11 and bearing 13 are taken up in the flexible fulcrum member 6. Thus substantially no vibrations are transmitted to the stationary main frame 1".

In order to fill the apparatus, the heavier liquid is first introduced in the series of vessels through the inlet tube of the first vessel, the air in the vessels being entirely displaced during this operation. The assembly of vessels is preferably arranged so that it can be slightly tilted, so as to facilitate the control of the amount of liquid trapped in each vessel during the filling operation. The lighter liquid is then fed through the series in the opposite direction, so that an approximately constant amount of heavy liquid is retained in each vessel. In operation, a slow current of the light liquid, preferably under a suitable hydrostatic head, is passed continually through the vessels from the inlet tube to the first vessel while the assembly is oscillated to cause oscillation of heavy stirring rods which are loose in the vessels and move backwards and forwards at right angles to the axes of the vessels. As a result of the action of these rods, the liquids are temporarily emulsified in the vessels but separate in the ascending exit tubes, so that only the lighter liquid is transmitted from one vessel to the next. The speed with which the lighter liquid can be allowed to travel depends on the degree of agitation obtained in the vessels, since sufficient time is required for solution equilibrium to be attained within each vessel. Where the difference of densities of the two liquids is not great or where they have a tendency to emulsify, there may be a danger of carrying over dispersion of the heavy liquid entrained in the lighter one, and the tendency for this to occur may set a practical limit to the speed with which the agitation and flow of liquid can be carried out. In the case of liquid systems where this factor is found to be important, improvement can be obtained by extending the vertical portion of the exit portions of the connecting tubes and increasing the diameter of these portions so as to give a longer space with slower linear flow rate where a separation of the liquids has more time to occur.

The same apparatus can also be used in cases where the heavier liquid is the one which is required to flow from each vessel to the next. The empty series of vessels is in this case first filled completely with the lighter liquid in the same way as above described. The ends of the series are then closed and the whole inverted so that the exit portions of the tubes lead from the bottom of each vessel instead of from the top. The series is then reconnected to its leading tubes through, for example, spherical ground joints, and the heavier liquid is then passed through the series from the exit tube of the last vessel, trapping an approximately constant amount of the light liquid in each vessel. The agitation rods are then set in motion and a slow flow of the heavy liquid is passed continuously through the series from the inlet tube of the first vessel.

It will be appreciated that the design of the vessels, and stirrers, is capable of considerable variation. The cylindrical stirrers may for example be replaced by spherical marbles. The mixing vessels also may be approximately in the form of oblate spheroids with vertical minor axis, inside which stirring marbles may execute a rotary motion. It has been found that a horizontal cylinder containing a loose fitting horizontal rod gives more rapid mixing than the other variations mentioned.

Since in no form of the apparatus hereinbefore described is there a rotation of any part about its own axis, the leading tubes taking the liquid into and out of the apparatus can be made of any flexible material which is chemically suitable for the operation concerned, since the leading tubes need only be flexible and are not subject to continuous twisting motion. Since an organic solvent will almost invariably be used in the apparatus and since absorption of any dissolved substance on the material of the vessels will be a serious disadvantage, these flexible leads will normally be made of thin glass tubing made sufficiently flexible by the conventional method of forming a considerable length into a spiral.

In cases where the apparatus is constructed of glass, the glass connecting inlet-outlet tubes may for convenience be interrupted if so desired with conical joints, or preferably spherical ground joints, of conventional type.

I claim:

1. An apparatus comprising a closed conduit having a single opening at one extreme and a single opening at the opposite extreme; said conduit containing between said extremes a plurality of sections which are serially connected, each of said sections consisting essentially of an inlet tube, a mixing vessel, a loose body and an outlet tube, said mixing vessel being substantially horizontally disposed, having a cross-sectional area greater than that of the inlet tube to which it is connected and enveloping the loose body, said loose body being a free mass having a cross sectional area less than that of the mixing vessel and being restricted by said mixing vessel, said outlet tube having a greater cross-sectional area than the inlet tube, being substantially vertically disposed and being attached to the mixing vessel; each of said outlet tubes extending from its respective mixing vessel in substantially the same direction; one inlet tube connecting one of said single openings to a mixing vessel, a further tube connecting the other of said single openings to an outlet tube, and each of the remaining inlet tubes connecting the mixing vessel in one section to the outlet tube of the preceding section.

2. An apparatus comprising a closed conduit having a single opening at one extreme and a single opening at the opposite extreme; said conduit containing between said extremes a plurality of sections which are serially connected, each of said sections consisting essentially of an inlet tube, a substantially cylindrical mixing vessel, a glass rod and an outlet tube, said mixing vessel being substantially horizontally disposed, having a cross-sectional area greater than that of the inlet tube to which it is connected and enveloping the glass rod, said glass rod having a cross-sectional area less than that of the mixing vessel and being restricted by said mixing vessel, said outlet tube having a greater cross-sectional area than the inlet tube, being substantially vertically disposed and being attached to the mixing vessel; each of said outlet tubes extending from its respective mixing vessel in substantially the same direction; one inlet tube connecting one of said single openings to a mixing vessel, a further tube connecting the other of said single openings to an outlet tube, and each of the remaining inlet tubes connecting the mixing vessel in one section to the outlet tube of the preceding section.

3. An apparatus comprising a closed conduit having a single opening at one extreme and a single opening at one extreme and a single opening at the opposite extreme; said conduit containing between said extremes a plurality of sections which are serially connected, each of said sections consisting essentially of an inlet tube, a substantially cylindrical mixing vessel, a magnetizable loose body and an outlet tube, said mixing vessel being substantially horizontally disposed, having a cross-sectional area greater than that of the inlet tube to which it is connected and enveloping the loose body, said loose body being a free mass having a cross-sectional area less than that of the mixing vessel and being restricted by said mixing vessel, said outlet tube having a greater cross-sectional area than the inlet tube, being substantially vertically disposed and being attached to the mixing vessel; each of said outlet tubes extending from its respective mixing vessel in substantially the same direction; one inlet tube connecting one of said single openings to a mixing vessel, a further tube connecting the other of said single openings to an outlet tube, and each of the remaining inlet tubes connecting the mixing vessel in one section to the outlet tube of the preceding section.

4. An apparatus comprising a closed conduit and a mechanical oscillating means; said conduit having a single opening at one extreme and a single opening at the opposite extreme and containing between said extremes a plurality of sections which are serially connected, each of said sections consisting essentially of an inlet tube, a mixing vessel, a loose body and an outlet tube, said mixing vessel being substantially horizontally disposed, having a cross-sectional area greater than that of the inlet tube to which it is connected and enveloping the loose body, said loose body being a free mass having a cross-sectional area less than that of the mixing vessel and being restricted by said mixing vessel, said outlet tube having a greater cross-sectional area than the inlet tube, being substantially vertically disposed and being attached to the mixing vessel; each of said outlet tubes extending from its respective mixing vessel in substantially the same direction; one inlet tube connecting one of said single openings to a mixing vessel, a further tube connecting the other of said single openings to an outlet tube, and each of the remaining inlet tubes connecting the mixing vessel in one section to the outlet tube of the preceding section; and said oscillating means being operatively connected to move each of the loose bodies within the vessel in which it is contained.

5. An apparatus comprising a closed conduit and a mechanical oscillating means; said conduit having a single opening at one extreme and a single opening at the opposite extreme and containing between said extremes a plurality of sections which are serially connected, each of said sections consisting essentially of an inlet tube, a mixing vessel, a loose body and an outlet tube, said mixing vessel being substantially horizontally disposed, having a cross-sectional area greater than that of the inlet tube to which it is connected and enveloping the loose body, said loose body being a free mass having a cross-sectional area less than that of the mixing vessel and being restricted by said mixing vessel, said outlet tube having a greater cross-sectional area than the inlet tube, being substantially vertically disposed and being attached to the mixing vessel; each of said outlet tubes extending from its respective mixing vessel in substantially the same direction; one inlet tube connecting one of said single openings to a mixing vessel, a further tube connecting the other of said single openings to an outlet tube, and each of the remaining inlet tubes connecting the mixing vessel in one section to the outlet tube of the preceding section; and said oscillating means being operatively connected to move each of the loose bodies in a direction at substantially right angles to the axis of the vessel in which it is contained.

6. An apparatus comprising a closed conduit, a support therefor and a mechanical oscillating means; said conduit having a single opening at one extreme and a single opening at the opposite extreme and containing between said extremes a plurality of sections which are serially connected, each of said sections consisting essentially of an inlet tube, a mixing vessel, a loose body and an outlet tube, said mixing vessel being substantially horizontally disposed, having a cross-sectional area greater than that of the inlet tube to which it is connected and enveloping the loose body, said loose body being a free mass having a cross-sectional area less than that of the mixing vessel and being restricted by said mixing vessel, said outlet tube having a greater cross-sectional area than the inlet tube, being substantially vertically disposed and being attached to the mixing vessel; each of said outlet tubes extending from its respective mixing vessel in substantially the same direction; one inlet tube connecting one of said single openings to a mixing vessel, a further tube connecting the other of said single openings to an outlet tube, and each of the remaining inlet tubes connecting the mixing vessel in one section to the outlet tube of the preceding section; said support comprising a rigid plastic sheath in which a portion of the closed conduit is embedded; and said oscillating means being operatively connected to move each of said loose bodies within the mixing vessel in which it is contained.

7. An apparatus comprising a closed conduit and a mechanical oscillating means; said conduit having a single opening at one extreme and a single opening at the opposite extreme and containing between said extremes a plurality of sections which are serially connected, each of said sections consisting essentially of an inlet tube, a substantially cylindrical mixing vessel, a magnetizable loose body and an outlet tube, said mixing vessel being substantially horizontally disposed, having a cross-sectional area greater than that of the inlet tube to which it is connected and enveloping the loose body, said loose body being a free mass having a cross-sectional area less than that of the mixing vessel and being restricted by said mixing vessel, said outlet tube having a greater cross-sectional area than the inlet tube, being substantially vertically disposed and being attached to the mixing vessel; each of said outlet tubes extending from its respective mixing vessel in substantially the same direction; one inlet tube connecting one of said single openings to a mixing vessel, a further tube connecting the other of said single openings to an outlet tube, and each of the remaining inlet tubes connecting the mixing vessel in one section to the outlet tube of the preceding section; and said oscillating means comprising a series of permanent magnets operatively connected to move each of the loose bodies in a direction perpendicular to the axis of the mixing vessel in which it is contained.

8. An apparatus comprising a closed conduit and a mechanical oscillating means; said conduit having a single opening at one extreme and a single opening at the opposite extreme and containing between said extremes a plurality of sections which are serially connected, each of said sections consisting essentially of an inlet tube, a mixing vessel, a magnetizable loose body and an outlet tube, said mixing vessel being substantially horizontally disposed, having a cross-sectional area greater than that of the inlet tube to which it is connected and enveloping the loose body, said loose body being a free mass having a cross-sectional area less than that of the mixing vessel and being restricted by said mixing vessel, said outlet tube having a greater cross-sectional area than the inlet tube, being substantially vertically disposed and being attached to the mixing vessel; each of said outlet tubes extending from its respective mixing vessel in substantially the same direction; one inlet tube connecting one of said single openings to a mixing vessel, a further tube connecting the other of said single openings to an outlet tube, and each of the remaining inlet tubes connecting the mixing vessel in one section to the outlet tube of the preceding section; and said oscillating means comprising a series of fixed electromagnets capable of being magnetized periodically and operatively connected to move each of the loose bodies in a direction perpendicular to the axis of the mixing vessel in which it is contained.

9. An apparatus comprising a closed conduit, a support therefore and a mechanical oscillating means; said conduit having a single opening at one extreme and a single opening at the opposite extreme and containing between said extremes a plurality of sections which are serially connected, each of said sections consisting essentially of an inlet tube, a substantially cylindrical mixing vessel, a magnetizable loose body and an outlet tube, said mixing vessel being substantially horizontally disposed, having a cross-sectional area greater than that of the inlet tube to which it is connected and enveloping the loose body, said loose body being a free mass having a cross-sectional area less than that of the mixing vessel and being restricted by said mixing vessel, said outlet tube having a greater cross-sectional area than the inlet tube, being substantially vertically disposed and being attached to the mixing vessel; each of said outlet tubes extending from its respective mixing vessel in substantially the same direction; one inlet tube connecting one of said single openings to a mixing vessel, a further tube connecting the other of said single openings to an outlet tube, and each of the remaining inlet tubes connecting the mixing vessel in one section to the outlet tube of the preceding section; said support comprising a structure of rigid thermoplastic material in which a portion of the closed conduit is embedded; and said oscillating means comprising a series of fixed electromagnets capable of being magnetized periodically and operatively connected to move each of the loose bodies in a direction perpendicular to the axis of the mixing vessel in which it is contained.

References Cited in the file of this patent

UNITED STATES PATENTS

| | | |
|---|---|---|
| 1,297,171 | Holley et al. | Mar. 11, 1919 |
| 1,906,757 | Kjellgren | May 2, 1933 |
| 2,048,820 | Schmid | July 28, 1936 |
| 2,424,273 | Haas | July 22, 1947 |
| 2,699,378 | Koelle | Jan. 11, 1955 |

OTHER REFERENCES

Sherwood and Pigford: Absorption and Extraction, 2nd ed., Chem. Eng. Series, McGraw-Hill, New York, pp. 392–3.